UNITED STATES PATENT OFFICE.

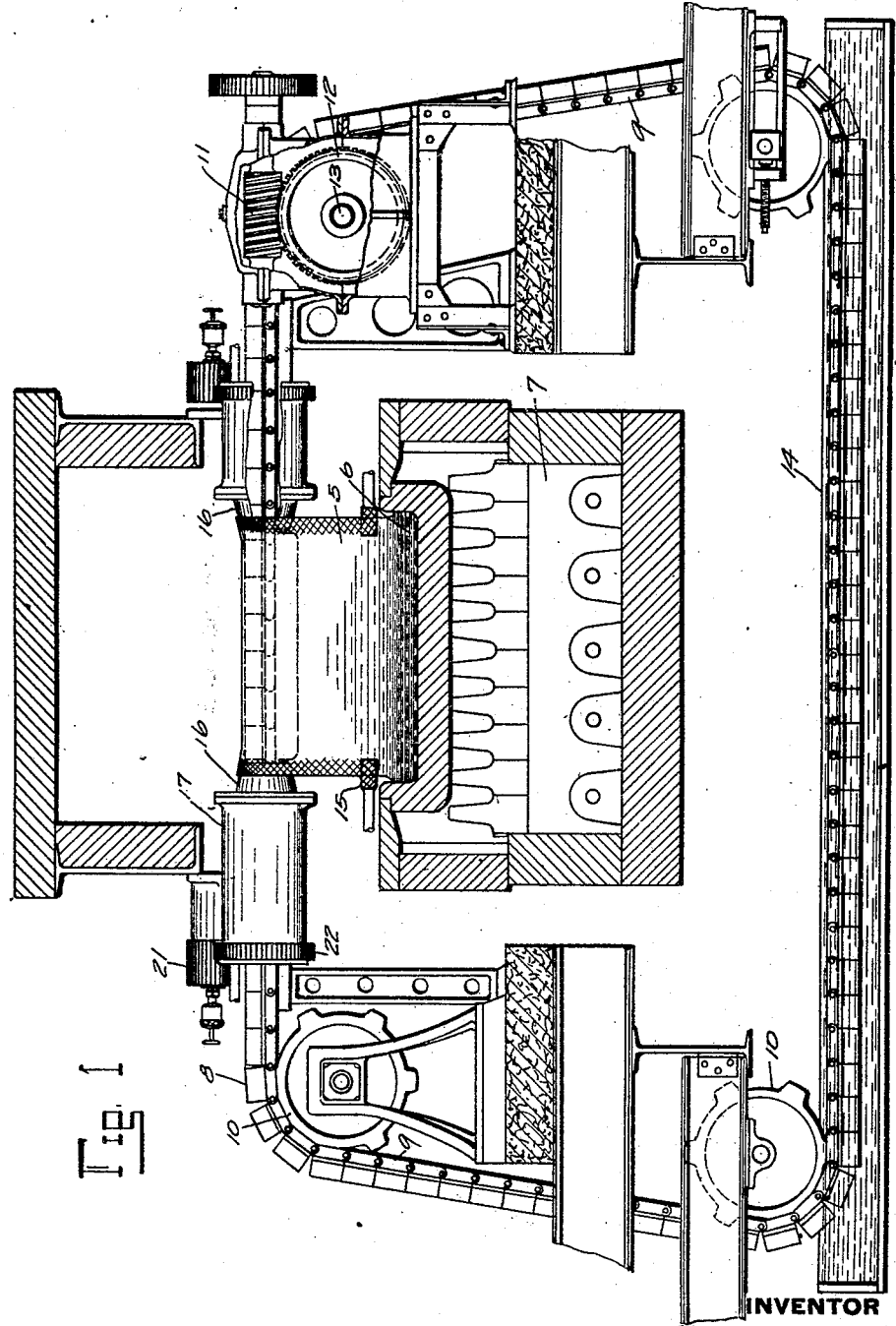

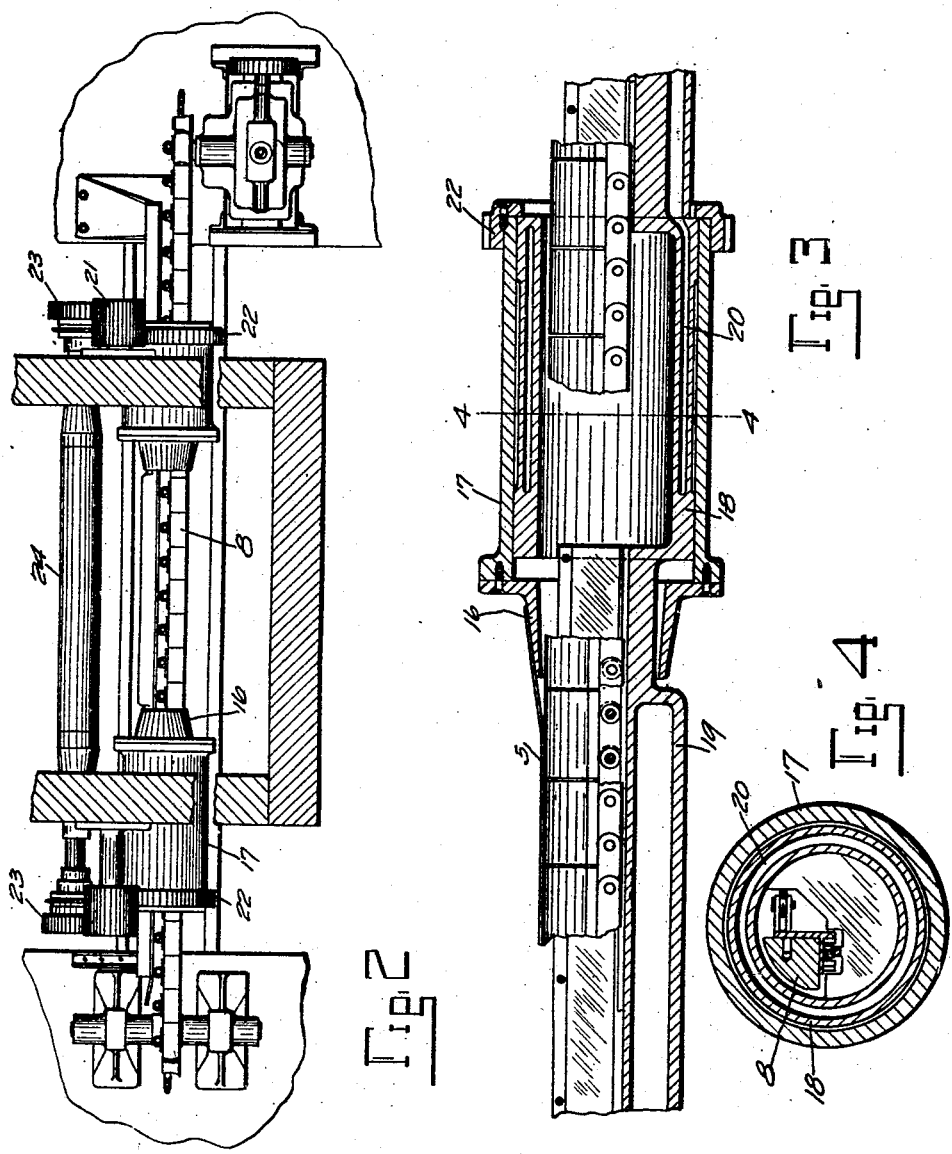

MICHAEL J. OWENS, OF TOLEDO, OHIO, ASSIGNOR TO THE LIBBEY-OWENS SHEET GLASS COMPANY, OF TOLEDO, OHIO, A CORPORATION OF OHIO.

APPARATUS FOR MAKING SHEET-GLASS.

1,319,175.  Specification of Letters Patent.  Patented Oct. 21, 1919.

Application filed February 9, 1918. Serial No. 216,187.

*To all whom it may concern:*

Be it known that I, MICHAEL J. OWENS, a citizen of the United States, residing at Toledo, in the county of Lucas and State of Ohio, have invented new and useful Improvements in Apparatus for Making Sheet-Glass, of which the following is a specification.

My invention relates to sheet glass forming apparatus of the type in which the molten glass is drawn upwardly in a continuous sheet from the tank and over a bending device by which it is bent to a horizontal direction in which it is fed through the leer.

In my co-pending application, Serial Number 177,181, I have shown a sheet glass forming apparatus of this type, in which the bending device comprises an endless chain of blocks over which the sheet of glass is drawn. This bending device runs continuously in one direction, the blocks being kept moist to prevent over-heating and to provide a bending surface which does not mar the glaze which forms on the glass.

The margins of the sheet as it is drawn upward from the tank are roughened by passing between knurled rolls, and in said application these roughened margins pass over stationary guides or surfaces, by which the edges of the sheet are deflected away from the bending device. The edges and roughened margins of the sheet are thus prevented from catching on the edges of the bending blocks, or coming in contact with and wearing said blocks.

An object of the present invention is to provide an improved construction for supporting and guiding the edges of the sheet as they pass over the bending device. For this purpose hollow drums are provided with conical or tapered bearing surfaces to support the margins of the sheet as it passes over the endless bending chain. The latter passes through said drums which are rotated so that the surfaces on which the glass bears move forward at substantially the same speed as the glass. These drums serve not only to assist in advancing the glass but are also effective to prevent the sheet of glass from being drawn sidewise by the wooden bending blocks, which are moving continuously transversely of the glass and exert more or less of a lateral pull thereon.

In the accompanying drawings, Figure 1 is a sectional elevation of sheet drawing apparatus constructed in accordance with my invention.

Fig. 2 is a fragmentary sectional plan view of the apparatus.

Fig. 3 is an enlarged sectional view through one of the drums.

Fig. 4 is a section at the line 4—4 on Fig. 3.

The glass is drawn in a continuous sheet 5 from the pot 6 containing molten glass supplied thereto from the melting or refining tank in the usual manner. A fire chamber 7 may be provided beneath the pot 6 for maintaining the glass at the required temperature.

The sheet of glass is drawn vertically from the tank and is bent or deflected to a horizontal direction by a bending device comprising blocks 8 made of wood or other equivalent material capable of sliding movement in contact with the surface of the plastic glass without injury to such surface. These blocks are carried by an endless chain 9 running over sprocket wheels 10. The chain of blocks is driven continuously from any suitable source of power, as for example, an electric motor connected to drive a worm 11 which in turn drives a worm gear 12 on a shaft 13 to which one of the sprockets 10 is secured. The lower horizontal lead of the chain runs in a trough of water 14 whereby the bending blocks are kept wet or moist. This prevents them from becoming overheated as they move in contact with the hot glass. The moisture also improves the surface of the blocks and by forming a thin film of steam between the blocks and the hot glass prevents injury to the natural glaze which has formed on the surface of the glass as it moves upward from the pot 6 to the bending device.

As the glass is drawn upward from the pot the edges are fed between knurled rolls 15 by which the margins of the sheet are roughened. As the sheet passes over the bending blocks the edges are deflected upwardly and outwardly by means of conical surfaces 16, so that the roughened margins do not come in contact with the bending blocks. The roughened margins and edges of the glass are thus prevented from wearing the bending blocks and also prevented from catching on the edges of the blocks.

The surfaces 16 are formed by the tapered ends of drums 17 located at opposite sides of the furnace and through which the chain of blocks passes. These drums are mounted for rotation on hollow cylindrical blocks 18 which may be attached to or formed integral with a supporting bar 19 which extends across the furnace. This bar supports the bending blocks as they travel beneath the sheet of glass. The blocks 18 may be provided with an annular space 20 in which water may be circulated to prevent overheating of the drum. The drums 17 are rotated to move the surfaces 16 in the direction of movement of the glass and preferably at substantially the same surface speed as that of the glass, so that there is little or no slipping of the glass on the surfaces 16. This rotation assists in advancing the glass and also renders said surfaces more effective in opposing any tendency of the glass to be drawn sidewise by the bending blocks 8. That is to say, the frictional holding power of the surfaces 16 is materially greater than would be provided by stationary surfaces over which the glass must slide. Any tendency, therefore, of the bending blocks 8 to move the glass sidewise is effectually overcome. The drums 17 may be rotated by any suitable means. As herein shown they are driven through pinions 21 meshing with gears 22 on the drums, said pinions being driven by gears 23 on the ends of a roll 24 over which the glass is advanced. Said gears may be driven by or form part of the usual train of gearing operating the rolls on which the glass is carried through the leer.

Modifications may be resorted to within the spirit and scope of my invention.

What I claim is:—

1. In a sheet glass forming apparatus, the combination with means for drawing a sheet of glass from a supply of molten glass, of a supporting device over which the sheet travels, means for moving said supporting device transversely of the sheet, and means providing supporting surfaces for the margins of the sheet where it passes over said supporting device and causing said supporting surfaces to advance in the direction of movement of the glass.

2. In sheet glass forming apparatus, the combination with means for drawing a sheet of glass from a supply of molten glass, a sheet bending device over which the glass is drawn, means to move said bending device transversely of the sheet, and means providing rotary supporting surfaces for the edges of the sheet where it passes over the bending device.

3. In sheet glass forming apparatus, the combination with means for drawing a sheet of glass from a supply of molten glass, a sheet bending device over which the glass is drawn, means to move said bending device transversely of the sheet, means providing surfaces engaging the side margins of the sheet where it passes over the bending device, and means to cause said surfaces to move with the glass while holding said margins out of contact with the bending device.

4. The combination with means for advancing a sheet of glass, of a supporting device extending transversely of the sheet, means for moving the supporting device transversely of the sheet, and drums through which said device extends, said drums mounted to rotate and having surfaces to engage the side margins of the sheet and advance therewith and hold the edges of the sheet away from said supporting device.

5. The combination with means for advancing a sheet of glass, of a supporting device extending transversely of the sheet, means for moving the supporting device transversely of the sheet, drums through which said device extends, said drums having surfaces to engage the side margins of the sheet and hold the edges of the sheet away from said supporting device, and positive means for driving the drums and causing said surfaces to advance at substantially the same speed as the glass.

6. In sheet glass drawing apparatus, the combination with means for drawing a sheet of glass from a supply of molten glass, of a direction changing device over which the sheet of glass passes, comprising a chain of bending blocks extending transversely beneath the sheet, means for driving said chain in the direction of its length, drums located at opposite sides of the sheet and through which said chain extends, said drums having supporting surfaces for the side margins of the sheet, and means to rotate said drums in the direction in which the glass is advanced.

7. In sheet glass forming apparatus, the combination with means for drawing a sheet of glass from a supply of molten glass, of a supporting device over which the sheet is drawn, means for moving said device transversely of the sheet, hollow members through which said device extends, and drums mounted to rotate on said members and having surfaces over which the margins of the sheet run.

8. In sheet glass forming apparatus, the combination with means for drawing a sheet of glass from a supply of molten glass, of a supporting device over which the sheet is drawn, means for moving said device transversely of the sheet, hollow members through which said device extends, drums mounted to rotate on said members and having surfaces over which the margins of the sheet run, and means to positively drive said drums and cause said surfaces thereof to advance at substantially the speed of the glass.

9. The combination with means for drawing a sheet of glass, of means providing surfaces arranged to engage the margins of the plastic sheet and deflect them out of the plane of the sheet, and means to cause said surfaces to advance with the contacting glass.

10. The combination with means for drawing a sheet of glass, of means providing a rotary surface positioned to engage the margin of the sheet and deflect it out of the plane of the sheet, and means to cause said surface to rotate and thereby advance with the contacting glass as the latter passes thereover.

11. The combination with means for continually drawing a sheet of glass from a supply of molten glass, of means providing a conical bearing surface positioned to engage the margin of the sheet and deflect it out of the plane of the sheet, and means to rotate said surface and thereby cause the portion thereof in contact with the glass to advance with the glass.

Signed at Toledo, in the county of Lucas and State of Ohio, this 5th day of February, 1918.

MICHAEL J. OWENS.